Dec. 22, 1964
N. ZUBRYCKYJ
3,162,587
ELECTROLYTIC PRECIPITATION OF METAL SULPHIDES
FROM LEACH SLURRIES
Filed May 8, 1959
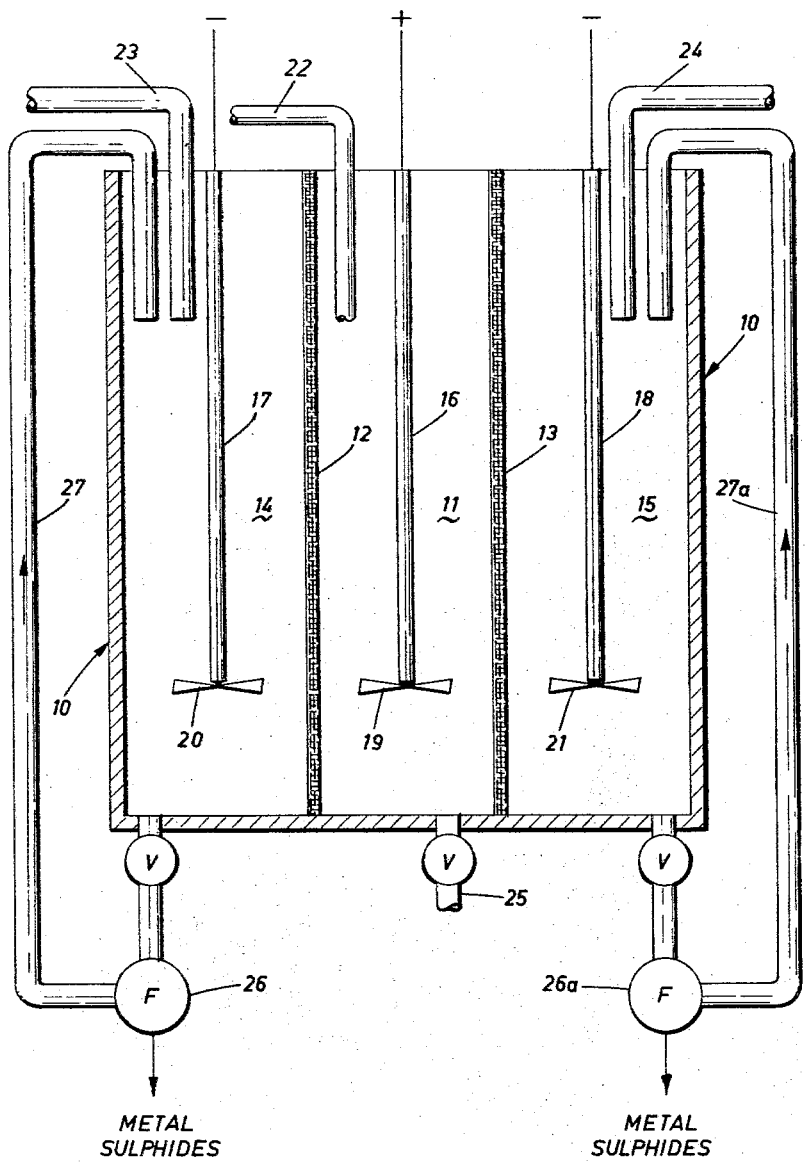
METAL
SULPHIDES
METAL
SULPHIDES
Inventor
NICOLAS ZUBRYCKYJ … # 3,162,587
ELECTROLYTIC PRECIPITATION OF METAL SULPHIDES FROM LEACH SLURRIES Nicolas Zubryckyj, Fort Saskatchewan, Alberta, Canada, assignor to Sherritt Gordon Mines Limited, Toronto, Ontario, Canada, a company of Ontario
Filed May 8, 1959, Ser. No. 811,847
5 Claims. (Cl. 204—92)

This invention relates to the separation and recovery of desired non-ferrous metal values from a slurry of solids and solution which contains such metal values.

Hydrometallurgical methods are known in which desired ferrous and non-ferrous metal values are extracted from metal bearing material and are dissolved in a neutral, acid or alkaline leach solution. The product of the leaching operation is a mixture, known in the metallurgical art as a slurry or pulp, and usually comprises undissolved residue, a solution of soluble salts of the desired metals and, possibly, excess leaching reagent. The undissolved solids, usually, are in a finely divided or pulverulent condition.

It is customary to separate leach solution which contains dissolved metal values from undissolved residue in a liquid-solids separation step prior to the treatment of the solution for the recovery of the desired metal values. Usually, this liquid-solids separation is effected in one or more of the conventional thickening and filtering operations, followed by repulping undissolved solids and washing them to ensure the substantially complete separation and recovery of entrained metal bearing leach solution. The rate and the efficiency of mechanical methods of separating metal bearing leach solution from undissolved solids depend on a number of factors which include, but are not necessarily limited to, the size and shape of the solid particles, the specific gravity and viscosity of the leach solution, the nature of the dissolved salts, and other factors, such as the temperature of the operation, which may effect the settling rate or the degree of coagulation or fluocculation of undissolved solid particles.

There are important disadvantages in the operation of conventional, mechanical methods of separating solutions which contain metal values from undissolved solids, such as the time required for conducting the operations, the loss of metal values entrained in the residue and the capital and operating costs of the equipment employed. The presence of colloidal or extremely finely divided solid particles, formed during grinding or leaching, or the presence in the solids of materials which, when suspended or dispersed in a liquid medium, tend to swell and become gelatinous and thereby increase the viscosity of the solution and cause the formation of gels, adversely affect the rate and the efficiency of the operation. Also, of course, large capital expenditures are required and the apparatus is relatively costly to operate.

The problem of separating undissolved residue from a metal bearing leach solution is particularly acute in the extraction of desired metal values from low grade metal bearing material which is not amenable to the economic concentration of desired metal values by known concentration processes. It is necessary to treat large amounts of material to obtain a recovery of metal in a predetermined unit of time which warrants the cost of installing and operating a commercial plant. A large volume of leach solution is required in order to obtain a satisfactory leaching rate and extraction efficiency. Thus, relatively high capital and operating costs are involved in separating the resultant leach solution from the undissolved residue. In addition, the resulting leach solution usually is relatively dilute in desired metal values. That is, it may contain only a few grams per litre. Direct recovery of desired metal values from such a dilute solution usually is not economic. Accordingly, the solution usually must be treated by some means to concentrate the desired metal values to produce a solution which can be treated economically for their recovery.

We have found by the process of this invention that desired non-ferrous metal values can be recovered from a leach solution derived from leaching non-ferrous metal bearing material without subjecting the slurry of undissolved residue and metal bearing leach solution to the usual liquid-solids separation step, such as thickening and/or filtering, for the separation of undissolved residue.

The process involves, in general, the steps of feeding a slurry of undissolved residue and leach solution which contains dissolved non-ferrous metal values into the anode compartment of a diaphragm type electrolytic cell. The anode compartment of the cell is separated from the cathode compartment by a porous diaphragm which is permeable to the flow of ions but which is impermeable to the passage of solid particles. The slurry in the anode compartment is agitated. An electrical current is applied to the slurry at a voltage below that at which impure metal would tend to form an adherent deposit on the cathodes so that the metals present in the solution in the cathode compartment can be precipitated therefrom as mteal sulphides by reaction with a sulphidizing agent.

Non-ferrous metal cations flow through the diaphragm into an agitated catholyte solution present in the cathode compartment. The pH value of the solution in the anode compartment is maintained below that at which insoluble basic metal compounds would tend to form and, preferably, below pH 5 and within the range of pH 2 to pH 4. The pH value of the solution in the cathode compartment is maintained at that at which good metal sulphide precipitation is obtained and, preferably, within the range of from about pH 3 to about pH 7. The temperature is maintained between about 100° to 200° F. during electrolysis.

Sulphide ions are provided in the catholyte in amount sufficient to combine with non-ferrous metal ions which migrate thereinto as insoluble metal sulphides. Metal sulphides precipitated in the cathode compartment are separated therefrom and can be treated separately by known processes for the recovery of desired metal values as product metals suitable for use in industry. Slurry depleted in dissolved metal values, is withdrawn from the anode compartment and can be treated for the recovery, if warranted, of any residual values, or it can be discarded.

The process of this invention is based on the results obtained in its actual operation and is independent of hypothetical considerations. A possible explanation of the phenomenon is that sulphide ions present in the catholyte combine with non-ferrous metal ions as they migrate through the porous diaphragm and before they have an opportunity of depositing on the cathode. Alternatively, the non-ferrous metal may deposit on the cathode and then reacts with the sulphidizing agent to form the insoluble non-ferrous metal sulphides. Whatever may be the explanation, however, it is found that substantially all the non-ferrous metal ions contained in the analyte migrate to the catholyte wherein they combine with the sulphidizing agent and precipiate from the solution as metal sulphides.

An understanding of the process of this invention can be obtained by the following description, reference being made to the accompanying drawing which illustrates, in section, an electrolytic cell suitable for use in the operation of the process.

Like reference characters refer to like parts throughout the description and the drawing.

Referring to the drawing, the numeral 10 indicates a conventional diaphragm type electrolytic cell which is provided with a centrally positioned anode compartment 11 separated by diaphragms 12 and 13 from the cathode compartments 14 and 15. An anode 16 extends from above the cell into the anode compartment, terminating a short distance above the bottom thereof. Cathodes 17 and 18 extend from above the cell into the respective cathode compartments 14 and 15. The anode and cathodes are connected to a source of electrical energy according to conventional practice.

The cathodes and anode can be formed of any conventional material used as electrodes in electrolytic reactions, such as mild steel, carbon, stainless steel, or lead. Insoluble electrodes preferably are employed.

The diaphragms 12 and 13 can be formed of conventional woven material of the type used as filter cloth which is permeable to the passage of solution but which is impermeable to the passage of solid particles. There are many types of woven filter cloth materials available, such as those prepared from synthetic fibres, wool, cotton, linen and the like and mixtures thereof. We have used linen filter cloth extensively with satisfactory results. The diaphragms extend from a point above the normal level of the slurry to the bottom of the cell.

Conventional mechanical agitators 19, 20 and 21 are provided respectively in the anode compartment 11 and in the cathode compartments 14 and 15.

In the operation of the cell, a slurry comprised of undissolved residue, which is principally in the form of finely divided, solid particles, and leach solution which contains dissolved non-ferrous metal values, is fed to the anode compartment 11 from conduit 22. The solid particles contained in the slurry are suspended in the solution by the action of the agitator 19. A voltage is applied to the cell sufficient to cause the overall process of cations discharging at the cathode and anions at the anode but below that at which impure metal would tend to form an adhering deposit on the cathode.

Clear solution from the slurry diffuses through the diaphragms and forms the catholytes in the cathode compartments.

Sulphide ions are provided in the cathode compartments of the cell in amount at least sufficient to combine with the non-ferrous metal ions which migrate thereinto as insoluble, non-ferrous metal sulphides. A sulphidizing agent such as sulphur in elemental form, metal sulphides such as pyrrhotite, and, preferably, hydrogen sulphide, which decompose rapidly under the conditions which prevail in the cathode compartments, can be employed as sources of the sulphide ions. The sulphide ions usually are provided in excess of the amount required to combine with the non-ferrous metal ions as insoluble metal sulphides. The sulphidizing agent can be supplied to the cathode compartments 14 and 15 through the conduits 23 and 24 respectively.

Slurry depleted in dissolved non-ferrous metal values is withdrawn, either continuously or intermittently, from the anode compartment through the conduit 25.

The slurry of catholyte, precipitated metal sulphides and excess sulphur or sulphides, if any, is withdrawn from the cathode compartment. Catholyte solution is separated from this slurry by a liquid-solids separation step such as by passing it through a filter 26–26a, or by thickening followed by filtering. As the particles are relatively coarse, they settle rapidly and can be separated very easily by filtration. Clarified solution from this liquid-solids separation step can be returned to the cathode compartments by the conduits 27–27a.

If desired, a salt can be added to the catholyte to improve its conductivity and thus reduce the voltage drop between the electrodes. There are a number of known salts which can be added to improve the conductivity of the electrolyte in electrolysis reactions of which we prefer to use a neutral salt such as sodium sulphate or ammonium sulphate.

It is found that the electrolysis reaction proceeds satisfactorily with an anolyte which has a hydrogen ion concentration within the range equivalent to from about pH 2 to about pH 5, preferably from about pH 2 to about pH 4 to prevent the formation and precipitation of basic, non-ferrous metal salts. Consequently, it is preferred to adjust the pH value, if necessary, to within this range by the addition to the anolyte of an alkali or acid reagent as required. Also, as the reaction is acid forming, it may be, and usually is, necessary to provide sufficient neutralizing agent, such as sodium hydroxide, to maintain the pH value of the anolyte within this range as the reaction proceeds.

A slightly higher pH value is maintained in the cathode compartment, for example, between pH 5 and pH 7 if elemental sulphur is used as the sulphidizing agent and from pH 3 to pH 7 if a metal sulphide such as pyrrhotite is employed.

The following examples illustrate the results which can be obtained in the operation of this process.

*Example I*

A slurry derived from leaching low grade nickel ore, about 1% nickel, with an aqueous sulphuric acid solution was treated.

2850 ml. of slurry comprised of 23% solids which contained 0.61% nickel, 47% iron and 3% sulphur and dilute aqueous acid sulphate solution which contained 6 grams per litre nickel and had a pH value of pH 2 were charged into the anode compartment of a cell of the type described above. Clear solution diffused through the linen filter cloth diaphragms. The cathodes were stainless steel with exposed faces 486 square centimeters in area. The anode was a mild steel sheet having exposed faces 180 square centimetres in area. Electrical current at a density of 11 amperes per square foot of cathode surface, which is less than the 11.5 to 12 amperes per square foot normally employed in the electrodeposition of nickel, was applied with a voltage drop between the electrodes of 5 volts. Electrolysis was continued at 194° F. for 4 hours using air to agitate the slurry.

18 grams of elemental sulphur in the form of finely divided particles were added to the catholyte during the electrolysis. This represented an excess of sulphide ions of 150% over the stoichiometric amount required to combine with the nickel as nickel sulphide. At the end of the electrolysis, the catholyte, sulphide precipitate, anolyte and anode compartment solids were analyzed and found to contain:

Catholyte _____ Nickel, 0.02 gram per litre.
Anolyte _____ Nickel, 0.25 gram per litre.

60 grams of cathode compartment solids contained 21.0% nickel, 24.4% iron and 30.1% sulphur. The anode solids contained 0.59% nickel, 53.4% iron and 2.3% sulphur. The high iron content was found in later tests to be due to the dissolution of the anode and the transfer of iron ions to the cathode compartment.

It will be noted that there was a recovery of 99.5% of the nickel contained in the catholyte and almost 96% of the nickel contained in the anolyte as a high grade nickel sulphide concentrate which contained 21% nickel, 24% iron and 30.1% sulphur. A concentrate of this grade is readily amenable to treatment by conventional hydrometallurgical or pyrometallurgical processes for the recovery of nickel as product metal. The powder consumption was about 5.0 kilowatts per pound of nickel contained in the nickel sulphide.

The solution from the leaching step had a pH value of about pH 0.6. This was adjusted to about pH 2 at the start of the electrolysis by the addition of sodium carbonate and was maintained within the range of from about pH 2 to about pH 3 during the electrolysis by the addition of 0.5 normal sodium hydroxide solution.

The tests were repeated on similar starting slurries under different operating conditions. The nickel sulphide concentrates obttained in a number of similar tests contained from 20% to 42% nickel. It was found that when insoluble lead anodes were employed, there was much less co-deposition of iron, and nickel sulphide concentrate was recovered from the cathode compartment which contained as little as from 2% to 3.5% iron and had a lead content less than 0.01%.

It was also found in the tests that the electrolysis should be conducted at a temperature within the range of from 100° to 200° F., preferably from 175° to 200° F., in order to obtain a rapid rate of formation of sulphide ions in the cathode compartment for reaction with the non-ferrous metal ions to form metal sulphides. It was found also that the metal sulphide forming reaction does not proceed at a satisfactory rate at a temperature below about 100° F.

*Example II*

2100 ml. of slurry comprised of 23% of solids which contained 0.33% nickel, 50.0% iron, 2.5% sulphur and dilute aqueous acid sulphate solution which contained 6 grams per litre nickel and had a pH value of 3.5 were charged into the anode compartment and electrolysis was continued for 3 hours using mechanical agitators to agitate the slurry in both compartments of the cell. 1 mol of sodium sulphate solution was added to the cathode compartment at the beginning of the electrolysis. Electrical current at a density of 11 amperes per square foot of cathode surface was applied with a voltage drop between the electrodes of 2.4 volts. The anode and the cathodes were the same as those described in Example I.

10.4 grams of elemental sulphur in the form of finely divided particles were added to the catholyte during electrolysis. This represents an excess of sulphur of 100% over the stoichiometric amount required to combine with nickel as nickel sulphide. At the end of the electrolytic reaction, the catholyte, sulphide precipitate, anolyte and anode compartment solids were analyzed and found to contain:

Catholyte _____. Nickel, less than 0.01 gram per litre.
Anolyte _____. Nickel, 0.37 gram per litre.

About 82.0% of the nickel in the starting slurry solution was recovered in 42.1 grams of cathode compartment solids which contained 18.5% nickel, 20.8% iron and 26.4% sulphur. The anode solids contained 0.17% nickel, 49.5% iron and 2.46% sulphur. The power consumption was about 2 kilowatts per pound of nickel contained in the nickel sulphide.

*Example III*

2250 ml. of slurry having the same composition as that treated in Example I was subjected to electrolysis under the conditions set out in Example I.

47 grams of pyrrhotite, $Fe_nS_{n+1}$, in the form of finely divided particles, were added to the catholyte during the electrolysis. This represented an excess of sulphide ions of 100% over the stoichiometric amount required to combine with the nickel as nickel sulphide. Electrolysis was continued for 4 hours. At the end of the 4 hour period:

The nickel content of the catholyte was reduced from 6 grams per litre to 0.1 gram per litre. The solids recovered from the cathode compartment contained 8.5% nickel, 49.0% iron and 26.7% sulphur.

The solids withdrawn from the anode compartment contained 0.57% nickel, 51.6% iron and 2.6% sulphur.

This represented a recovery, as nickel, sulphide, of about 96.7% of the nickel contained in the anolyte.

The operation of the process has been described as applied to the production of a nickel sulphide concentrate suitable for economically practical treatment by known pyrometallurgical or hydrometallurgical methods for recovering the nickel as product metal. It will be understood, of course, that the process can be applied to the electrochemical dissociation of the solute content of slurries which contains dissolved salts of other non-ferrous metals such as silver, copper, lead, zinc, cobalt and the like without departure from the scope of the invention defined by the appended claims.

What I claim as new and desire to protect by Letters Patent of the United States is:

1. In a process for recovering values of a metal selected from the group consisting of silver, copper, lead, zinc, nickel and cobalt from metal bearing material in which finely divided metal bearing material is leached with a leach solution to form a slurry of undissolved residue and a solution which contains dissolved values of at least one of said metals, the improved method of separating said dissolved metal values from said slurry which comprises the steps of feeding said slurry of leach solution and undissolved residue into an anode compartment of an insoluble anode, diaphragm type electrolytic cell having at least one anode compartment and at least one cathode compartment, said compartments being separated from each other by a diaphragm permeable to the passage of ions and impermeable to the passage of solid particles, said solution forming the anolyte in said cell, electrolyzing said anolyte at a pH value within the range of from about pH 2 to about pH 5 and at a temperature within the range of from about 100° to about 200° F. whereby ions of at least one of said dissolved metals migrate through said diaphragm into the cathode compartment, a catholyte in said cathode compartment having a pH value within the range of from about pH 3 to about pH 7, providing in said catholyte a sulphidizing agent in amount at least sufficient to provide sulphide ions for combination with metal ions migrating into said catholyte as insoluble metal sulphides, and separating and recovering said insoluble metal sulphides from the cathode compartmnet of said cell.

2. In a process for recovering values of a metal selected from the group consisting of silver, copper, lead, zinc, nickel and cobalt from metal bearing material in which finely divided metal bearing material is leached with a leach solution to form a slurry of undissolved residue and a solution which contains dissolved values of at least one of said metals, the improved method of separating said dissolved metal values from said slurry which comprises the steps of feeding said slurry of leach solution and undissolved residue into an anode compartment of an insoluble anode, diaphragm type electrolytic cell having at least one anode compartment and at least one cathode compartment, said compartments being separated from each other by a diaphragm permeable to the passage of ions and impermeable to the passage of solid particles, said solution forming the anolyte in said cell, electrolyzing said anolyte at a pH value within the range of from about pH 2 to about pH 5 and at a temperature within the range of from about 100° to about 200° F. whereby ions of at least one of said dissolved metals migrate through said diaphragm into the cathode compartment, a catholyte in said cathode compartment having a pH value within the range of from about pH 3 to about pH 7, providing in said catholyte a sulphidizing agent selected from the group consisting of elemental sulphur, pyrrhotite, and hydrogen sulphide in amount at least sufficient to provide sulphide ions for combination with metal ions migrating into said catholyte as insoluble metal sulphides, and separating and recovering said insoluble metal sulphides from the cathode compartment of said cell.

3. The process according to claim 2 in which a member selected from the group consisting of ammonium sulphate and sodium sulphate is added to the catholyte.

4. The process according to claim 2 in which slurry is charged continuously into and withdrawn from the anode compartment and sulphidizing agent is charged continuously into and catholyte and precipitated metal sulphides are continuously withdrawn from the cathode compartment.

5. In a process for recovering values of a metal selected from the group consisting of silver, copper, lead, zinc, nickel and cobalt from metal bearing material in which finely divided metal bearing material is leached with a leach solution to form a slurry of undissolved residue and a solution which contains dissolved values of at least one of said metals, the improved method of separating said dissolved metal values from said slurry which comprises the steps of feeding said slurry of leach solution and undissolved residue into an anode compartment of an insoluble anode, diaphragm type electrolytic cell having at least one anode compartment and at least one cathode compartment, said compartments being separated from each other by a diaphragm permeable to the passage of ions and impermeable to the passage of solid particles, said solution forming the anolyte in said cell, electrolyzing said anolyte at a pH value within the range of from about pH 2 to about pH 5 and at a temperature within the range of from about 100° to about 200° F. whereby ions of at least one of said dissolved metals migrate through said diaphragm into the cathode compartment, a catholyte in said cathode compartment having a pH value within the range of from about pH 3 to about pH 7, providing in said catholyte a sulphidizing agent selected from the group consisting of elemental sulphur, pyrrhotite, and hydrogen sulphide in amount at least sufficient to provide sulphide ions for combination with metal ions migrating into said catholyte as insoluble metal sulphides, withdrawing catholyte and precipitated metal sulphides from the cathode compartment, separating precipitated metal sulphides from said withdrawn catholyte, and returning clarified catholyte to the cathode compartment of said cell.

References Cited in the file of this patent

UNITED STATES PATENTS

| | | |
|---|---|---|
| 272,391 | Thiollier | Feb. 13, 1883 |
| 669,440 | Frasch | Mar. 5, 1901 |
| 1,209,835 | Grenawalt | Dec. 26, 1916 |
| 1,315,982 | Moulton | Sept. 16, 1919 |
| 1,502,213 | Rodrian | July 22, 1924 |
| 1,887,264 | Grengle | Nov. 8, 1932 |
| 2,835,632 | Kollsman | May 20, 1958 |

FOREIGN PATENTS

| | | |
|---|---|---|
| 113,508 | Great Britain | Feb. 28, 1918 |